United States Patent Office.

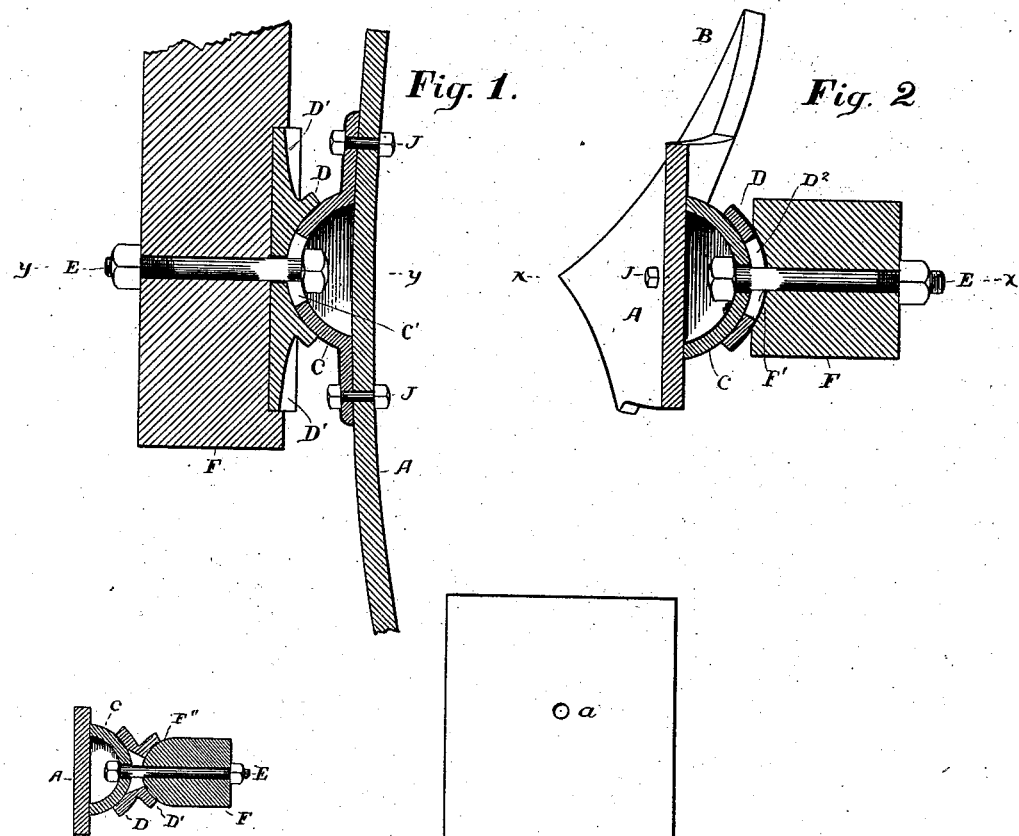

WILLIAM F. DICKISON, OF MOSSVILLE, ILLINOIS.

CULTIVATOR-SHOVEL.

SPECIFICATION forming part of Letters Patent No. 292,795, dated February 5, 1884.

Application filed July 23, 1883. (No model.)

*To all whom it may concern:*

Be it known that I, WILLIAM F. DICKISON, of Mossville, in the county of Peoria, in the State of Illinois, have invented an Improved Cultivator-Shovel and Coupling; and I do hereby declare that the following is a full, clear, and exact description thereof, reference being had to the annexed drawings, making a part of this specification, in which like letters of reference refer to like parts, and in which—

Figure 1 represents a vertical section through X X; Fig. 2, a horizontal section through Y Y; Fig. 3, a front view of cultivator-blade alone; Fig. 4, a modified form of the invention.

The object of this invention is the construction of a shovel-blade for cultivators, whereby the soil can be thoroughly loosened to the very roots of the corn, potatoes, or other plant to be tended, and that shall be capable of angular adjustment in any desired direction.

My plow-blade, which is twisted somewhat similarly to other plows previously patented, has a spur, B, projecting from its side, as shown in Figs. 2 and 3. This spur B, I usually make horizontal at its upper side, but on a straight slope from its end to the point of the blade A. In the full-sized plow the horizontal length of this spur is about two inches; but I do not of course restrict myself to any exact dimensions.

F is the sheth, to which the shovel A is fastened, and angular adjustment thereon is secured by the following construction: The socket D rests in a vertically-cylindrical recess in the sheth F, its back D' being cylindrical to correspond. Within said socket D is held the hollow hemisphere C, having arms C'', to which the shovel-blade A is bolted. Through said hemisphere C is a vertical slot equal in width to the bolt E, by which the whole is held to the sheth F. Through the socket D is a similar slot, D², but horizontal instead of vertical.

As shown in Fig. 1, the coupling enables the shovel A to be oscillated back and forth or sidewise in vertical planes. Fig. 2 shows how it may be turned sidewise in a horizontal plane. The socket D, in order to cause such a motion, must have the radius of curvature of its convex face greater than that of its concave face, in which rests the hemisphere C. By shifting the position of said socket D to one side, the hemisphere C and its attached shovel will thereby be canted in the same direction. By making the curvature of said face in contact with the hemisphere C greater than the curvature of the convex face, the shovel A would still be canted, but in the opposite direction than before.

In Fig. 4 the socket D is shown as fitted to the sheth F against a convex face on the same. This way works practically about the same as the other.

By loosening and tightening the bolt E, the shovel A is changed and held in any position which the construction of the socket D and the hemisphere C will allow.

As this plow-blade and its universal-swiveling coupling is intended especially for double-shovel cultivators, the blades A must be made right and left handed, that the spurs B may in each point outwardly. The spurs B, projecting so far from the shank of the blades, and also from their supporting-sheth F, enables the soil to be loosened close up under the roots of the corn without danger of breaking down or otherwise injuring the stalks of the corn by the said shank or sheth. To still further lessen this danger, the shovel-point can be adjusted angularly toward the row of corn.

By means of my universal coupling I can move the point of the shovel to one side, and also so turn it as to keep the same angle of advance which it makes with the soil. I can turn the plow to press the soil inwardly or outwardly, (more or less, according to the condition of the ground,) and still keep the point of the plow-blade so in the line of advance of the cultivator as to entirely prevent any lateral pressure against them from the ground, which would otherwise have to be overcome by the strength of the driver applied to the handles of the machine.

What I claim as my invention, and for which I desire Letters Patent, is as follows, to wit:

The shovel-blade A, with a point formed with unequal sides, as shown, having the spur B, the upper side of which is approximately horizontal, and a shorter extension on the opposite side, and extending from each corner in a straight line to a central point, forming working-edges of different angles to the upper portion of the shovel, substantially as shown and described.

In testimony that I claim the foregoing invention I have hereunto set my hand this 14th day of July, 1883.

WILLIAM F. DICKISON.

Witnesses:
NEWTON MATTHEWS,
C. N. MIHIGAN.